United States Patent Office 3,038,341
Patented June 12, 1962

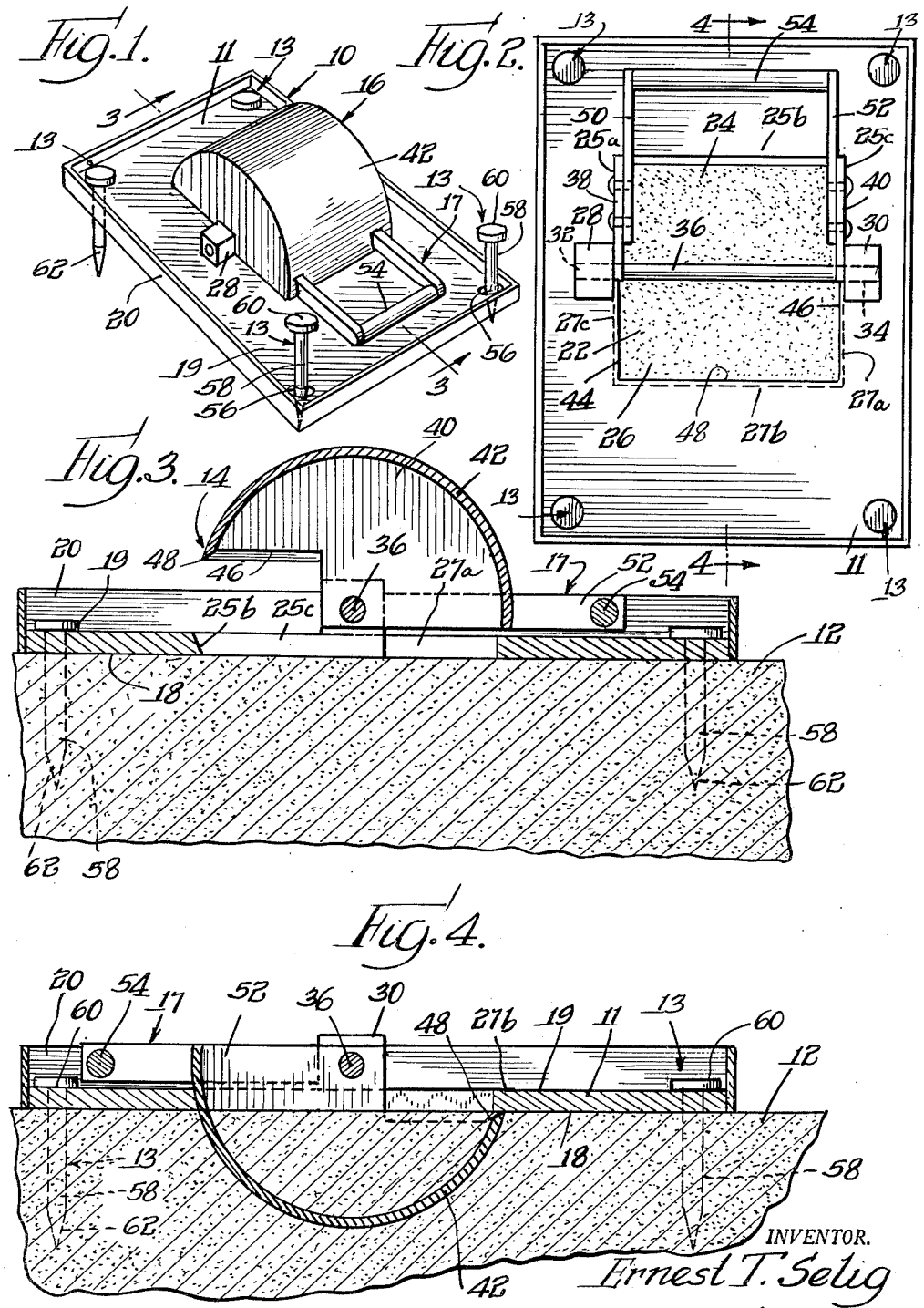

3,038,341
FIXED VOLUME SAMPLE TAKING DEVICE
Ernest T. Selig, 3101 S. Wabash Ave., Chicago, Ill.
Filed Dec. 30, 1960, Ser. No. 79,615
12 Claims. (Cl. 73—424)

This invention relates to a device for taking a sample of a fixed volume and especially for taking fixed volume samples of granular material from a large supply for the purpose of determining the density of the granular material.

It has been found that in certain areas of scientific investigation, as well as in certain business enterprises, it is necessary to determine the surface density of a granular material which material has no or slight cohesion. A typical example of such a material is dry sand. However, other similar materials exhibit many of the same properties and give rise to the same problems. A common method of determining density is to dig a hole into a material, weigh the material removed, and measure the volume of the hole. Perhaps the simplest method of measuring the volume of the hole is with a ruler or other such device. This particular method of determining the volume of the granular material removed is not accurate, inasmuch as the granular material tends to cave into the hole and change the dimensions. Furthermore, the removal of the material often changes the size of the hole because of a slight relocation of material around the hole so that inaccuracies in the determination of the density occur. Certain present devices remove a fixed quantity of material but change the density of the material in its removal so that there tend to be inaccuracies in the determination of density.

It is, therefore, the principal object of the hereindisclosed invention to provide a device for removing a fixed quantity of granular material for weighing so that the granular material may be weighed to determine the density of the granular material in its preremoval state.

It is another object of the present invention to provide a device for taking a sample of granular material which sample of granular material is an accurate representation of the volume of the material in its natural state.

It is another object of the present invention to provide a device for taking a sample of a granular material wherein a cutting edge is rotated about a fixed axis of rotation to generate a continuous surface and the material in the volume of the surface is scooped up within a retainer behind the cutting edge for removal.

It is a still further object of the instant invention to provide a device for taking a sample of a granular material which device is secured in a plane parallel to the upper surface of the granular material to insure removal of a fixed volume of granular material.

Other objects and uses of the hereindisclosed invention will become readily apparent to those skilled in the art upon a perusal of the appended specification in light of the accompanying drawing in which:

FIGURE 1 is a perspective view of a device embodying the hereindisclosed invention which device is shown in a position partially ready for taking a sample;

FIGURE 2 is a plan view of the device shown in FIGURE 1 but in a sample-taking position;

FIGURE 3 is a cross-sectional view taken on line 3—3 of FIGURE 1; and

FIGURE 4 is a cross-sectional view taken on line 4—4 of FIGURE 2.

Referring now to the drawing, it may be seen that a fixed volume sample taking device, generally indicated by numeral 10 and embodying the instant invention; generally includes a flat plate 11 which is placed into engagement with a granular material 12, four identical pins 13 removably mounted in the plate for holding the plate relative to the upper surface of the material 12, a cutting edge or blade 14 which is rotatable about a fixed axis relative to plate 11, a retainer 16 integral with the cutting edge and a handle 17 which is secured to the retainer for rotating the cutting edge and the retainer.

Plate 11, as was mentioned above, is a plate which has a flat bottom 18 and, in this instance, a flat upper or catching surface 19. The plate is generally rectangular though any other shape is suitable. A retaining edge 20 is secured around the entire outer periphery of the plate for reasons which will become apparent hereinafter. In the center of the plate, there is an opening 22 which generally consists of two portions. One of the portions is a rectangular entrance aperture 24 which includes three straight flat surfaces 25a, 25b and 25c; and surface 25b, which is a sloping surface, is perpendicular to the other two surfaces which two surfaces are perpendicular to the flat bottom. The other portion of aperture 22 is, in this instance, a rectangular relief aperture 26 opening into the larger entrance aperture 24. Relief aperture 26 like the entrance aperture has three straight flat surfaces 27a, 27b and 27c of which surface 27b is perpendicular to the other two surfaces, but all three surfaces are perpendicular to the bottom.

In the center of the plate's upper surface 19 and adjacent to the aperture 22, there is a pair of pivot blocks 28 and 30. The blocks 28 and 30 have axial holes 32 and 34, respectively, which holes are aligned and the centerline of the holes extends along one edge of rectangular aperture 24 as may be seen in FIGURE 2. The blocks 28 and 30 have rotatably mounted therein an axle 36 which is free to rotate in the blocks. It may be noted that the axis of rotation of the axle is coincidental with the centerline of the holes 32 and 34.

The retainer 16 is mounted on the axle 36 and is rotatable about the axis of rotation of the axle. The retainer consists of a pair of side walls 38 and 40 which are mounted on the axle 36 adjacent to blocks 28 and 30, respectively. Each of the side walls has a circular outermost periphery defining one edge as may be clearly seen in FIGURE 3. Fixed to the outer periphery of both of the side walls is an arcuate wall 42 which is in sealing engagement with the side walls to provide a completely enclosed scoop or container.

As was mentioned above, a bevelled cutting edge 14 is formed integral with the retainer 16. The cutting edge 14 consists of a pair of bevelled lateral cutting edges 44 and 46 on side walls 38 and 40, respectively, which are parallel to each other and cooperative with surfaces 25a and 25c. It should be noted that the bevelled cutting edges 44 and 46 are identical and they are both bevelled inward so that the leading edge is on the outside portion. The remainder of the bevelled cutting edge is a leading bevelled edge 48 on arcuate wall 42 which edge 48 is cooperaitve with surface 25b. The cutting edge 48 extends from the end of cutting edge 44 to the end of edge 46. Thus, it may be seen that the cutting edge defines three sides of a rectangle. The bevelled cutting edge extends from a point adjacent to the axis of rotation to the outer periphery of the side walls. It should be noted that the cutting edge is just slightly smaller than the rectangular aperture 24 in plate 11, so that the cutting edge is registerable with the aperture and the cutting edge is capable of passing adjacent to the plate with no interference from the plate but there is no space between the cutting edge and the sloped surfaces 25a, 25b and 25c for material to pass between the cutting edge and the plate. However, the rectangular aperture 26 is slightly smaller than the outermost edge of the cutting edge; thus, the cutting edge is in interference with the plate when the cutting edge engages the plate on the bottom side as shown in FIGURE 4.

The handle 17, which was mentioned above, is secured to the retainer 16. The handle consists of a pair of parallel bars 50 and 52 which are secured to the side walls 38 and 40, respectively, by conventional screws. A gripping member 54 is secured to the parallel bars 50 and 52 to complete the handle 17.

It is evident that when the instant device is placed into operation by applying an appropriate generally upward force to the handle, retainer 16 rotates the axle and the cutting edge engages the material 13. As the cutting edge is forced into the material, a reaction force at each of the pivot blocks tends to move the plate in a direction perpendicular to the axle and from surface 27b toward surface 25b. Should any movement occur, the volume of material included within the retainer would not be that of the fixed volume of the device since the axis of the cutting edge would be transposed during pivoting of the cutting edge. The aforementioner pins 13 are provided to prevent any such movement of the device in a plane parallel to the upper surface of the granular material.

Plate 11 has at each of its corners a pin hole 56 which is perpendicular to the plate's bottom. In each of the pin holes there is positioned one of the pins 13. Each pin is identical to each other pin and consists of a shank 58 which has a diameter slightly less than the diameter of a pin hole, an enlarged flat head 60 integral with one end of the shank, and a point 62 integral with the other end of the shank. The pins are positioned in their respective pin holes and are driven into the granular material to anchor securely the plate to the material for proper operation.

The device 10 may be used in determining the density of a particular granular material in the following manner. First, the flat plate 12 is placed on a generally flat surface of the material to be measured. Pins 13 are placed in their respective holes and are driven into the material to provide plate holding means. When the device 10 is in position with the retained in the attitude shown in FIGURES 1 and 3, on a granular material as shown in FIGURE 3, the device is ready for operation. The operator simply grips handle 17 and rotates the cutting edge 14 about the axis of rotation which is coincidental with the center line of the holes through mounting blocks 28 and 30. As the cutting edge 14 is rotated, it is apparent that the cutting edge 48 generates a cylindrical surface while cutting edges 44 and 46 generate planes which planes intersect the cylindrical surface generated by cutting edge 48. At the conclusion of its rotation about its axis, cutting edge 48 engages bottom 18 of the plate where the generation of the cylindrical surface ends as does the generation of the planes by cutting edges 44 and 46. It may be appreciated that in this instance the cutting edge 14 generates a cylindrical surface and two planes bounding the ends of the cylindrical surface as the cutting edge passes through the plates and on to engagement with the bottom of the plate. Inasmuch as the planes generated by the cutting edges 44 and 46 define parallel planes which intersect a plane defined by bottom 18 of flat plate 11 and the plane of bottom of the plate intersects the cylindrical surface generated by cutting edge 48, a definite volume is then included by the three planes and the cylindrical surface. This particular volume is, of necessity, a fixed volume which remains constant for the instant device.

Inasmuch as the edges 44, 46 and 48 are bevelled inward, the cutting edge passing through the material does not disturb the density of the material which is adjoined to the material to be removed. The material which is to be removed is pushed inward and upward toward the aperture 22 so that as the cutting edge passes easily through the material, the arcuate wall and side walls 38 and 40 move readily into position to keep the material outside the retainer in place and the material which is in the confines of the volume being generated is pushed upward and captured within the retainer 16. It may be appreciated that once the cutting edge passes through the material it is irrelevant whether the density of the material within the retainer is disturbed or not, inasmuch as the density at the instant before the passage of the cuttting edge is the density to be determined and that density is what properly determines the weight of material within the volume of the generated surfaces described above.

After generation of the surfaces is completed, that is, the cutting edge is moved from the attitude shown in FIGURE 3 to that shown in FIGURE 4, the device is then lifted from the material being tested and the device is opened. The material held by the retainer is transferred onto a conventional scale, which is not shown, for weighing. It may be appreciated that in the event that the density of the material is great, the thickness of the retaining wall may push upward a considerable amount of material, especially since the density is disturbed once the cutting edge passes the material. The tested material has no opportunity to escape from the device inasmuch as there is a retaining edge along the outer periphery of the flat plate which prevents material from escaping, thus, there is no error in the density measurement. It is, of course, obvious that once the material is weighed it is a very simple matter to compute the density inasmuch as the volume of the device is fixed. It is to be appreciated that a chart for a particular device of a particular volume may be made from which chart the density is immediately determined upon determination of the weight of the material.

It is clear from the foregoing that the instant device does not depend upon taking any measurements after the hole is made but rather the volume is fixed by the device. The volume of the material is captured in its entirety within the retainer inasmuch as the cutting edges are bevelled inward. Thus, the likelihood of error is reduced to a minimum.

It is obvious that the device 10 is a device which uses three straight lines to generate volume defining surfaces. However, it is obvious that other surfaces may be generated by a single line or combination of lines by a selected cutting edge. It is appreciated that those skilled in the art may make various modifications and alterations in the instant invention without departing from the spirit and scope of the invention. It is to be expressly understood that the instant invention is limited only by the appended claims.

What is claimed is:

1. A device of the character described comprising, in combination, a plate having an aperture contained therein, said aperture having a rectangular portion, a retaining edge on the outer periphery of said plate, a pair of pivot blocks mounted on one side of said plate on opposite sides of the aperture adjacent to the rectangular portion thereof, an axle mounted in said pivot blocks, a pair of side walls mounted on said axle, said axle and side walls being pivotal relative to said pivot blocks about a fixed axis of rotation, each of said side walls having a bevelled cutting edge with the bevel extending inward, each of said side walls having its outermost portion being a portion of a circle having its center on the axis of rotation of the side walls, an arcuate wall sealingly secured to the side walls at the outermost periphery of each of the side walls, a bevelled lead cutting edge on the arcuate wall with the bevel extending inward, said leading edge extending from the cutting edge on one side wall to the cutting edge on the other side wall, a handle attached to the side walls, said plate having a plurality of pin apertures extending therethrough, and an elongated pin removeably mounted in each of said pin apertures, whereby said plate is placed on a granular material, the pins are driven into the granular material to hold the plate in position, and the cutting edges are pivoted about the axis of rotation to generate fixed surfaces containing a volume of granular material, which volume of granular material is held within the arcuate wall and side walls.

2. A device of the character described comprising, in combination, a plate having an aperture contained therein, a retaining edge secured to said plate surrounding the aperture in said plate, a pair of pivot blocks mounted on said plate on opposite sides of said aperture, a blade pivotally mounted on said pivot blocks, said blade conforming to the configuration of the aperture on one side of the pivot blocks, and a retainer sealingly secured to the blade defining a surface of generation of the blade.

3. A device of the character described comprising, in combination, a plate having an aperture contained therein, a retaining edge on the outer periphery of said plate, a blade pivotally mounted on one side of the plate, said blade mateable with a portion of the aperture and being passable through the aperture to the other side of said plate, said blade being bevelled sloping inward for forcing a displaced material inward of the blade, and a retainer sealingly secured to the blade defining a surface of generation of the blade.

4. A device of the character described comprising, in combination, a plate having an aperture contained therein, a pair of pivot blocks mounted on one side of said plate on opposite sides of said aperture, a blade pivotally mounted on said pivot blocks, said blade conforming to the configuration of the aperture on one side of the pivot blocks, and a retainer sealingly secured to the blade defining a surface of generation of the blade, whereby said blade generates a surface of generation and the plane of the bottom of the plate cooperates with the surface of generation to define a fixed volume.

5. A device of the character described comprising, in combination, a plate having an aperture contained therein, a blade pivotally mounted on said plate, said blade conforming to the configuration of a portion of the aperture, and a retainer sealingly secured to the blade defining a surface of generation of the blade, whereby the blade pivots on the plate from one side of the plate to another to define a surface of generation intersecting the plate and the retainer defines the surface of generation to define a volume between the retainer and the plane of the bottom of the plate.

6. A device of the character described comprising, in combination, a plate having an aperture contained therein, a blade pivotally mounted on one side of the plate, said blade mateable with a portion of the aperture and being passable through the aperture to the other side of said plate, said blade being bevelled sloping inward for forcing a displaced material inward of the blade, and a retainer secured to the blade defining a surface of generation of the blade.

7. A device of the character described comprising, in combination, a plate having an aperture contained therein, a pair of pivot blocks mounted on one side of said plate on opposite sides of said aperture, a blade pivotally mounted on said pivot blocks, said blade mateable with the configuration of a portion of the aperture and being passable through the aperture to the other side of said plate, said blade being bevelled sloping inward for forcing a displaced material inward of the blade, and a retainer sealingly secured to the blade defining a surface of generation of the blade about the axis of rotation on the pivot blocks.

8. A device of the character described comprising, in combination, a plate having an aperture contained therein, a blade pivotally mounted on said plate, said blade conforming to the configuration of a portion of the aperture, a retainer sealingly secured to the blade defining a surface of generation of the blade, and a plurality of pins connected to said plate extending away from said plate, whereby the blade pivots on the plate from one side of the plate to another to define a surface of generation intersecting the plate and the retainer defines the surface of generation to define a volume between the retainer and the plane of the bottom of the plate.

9. A fixed volume sample taking device for taking a fixed volume of a granular material at a uniform density comprising, in combination, a plate having a flat bottom and an upper surface, a retaining edge on the outer periphery of said plate, said plate having an aperture therein, a blade pivotally mounted on the upper surface of the plate and being pivoted about a fixed axis, said blade engageable with a portion of the plate defining the aperture adjacent to the bottom of the plate and being passable through the aperture, a retainer secured to the blade defining a surface of generation of the blade sealingly cooperative with the aperture defining portions of the plate, and a plurality of pins mounted on the plate extending downward from the flat bottom, whereby the device is placed on a granular material, the pins are driven into the granular material to secure the plate to the material, the blade is rotated to cut through the material, and the material between the bottom of the plate and the surface of generation is held in the retainer.

10. A fixed volume sample taking device comprising, in combination, a plate having a flat bottom surface, said plate having an entrance aperture and a relief aperture opening on to the entrance aperture, a blade being pivotally mounted on the side of the plate opposite the flat bottom surface and being pivotal about a fixed axis of rotation, said blade being mateable with the entrance aperture and passable therethrough, said blade being bevelled sloping inward for forcing a displaced material inward of the blade and upward toward the relief aperture, and a retainer secured to the blade defining a surface of generation of the blade about the axis of rotation, whereby the device is positioned on a granular material and the blade is rotated about its axis of rotation to cut through the material and the material between the plane of the bottom of the plate and the surface of generation is held in the retainer.

11. A device of the character described comprising, in combination, a plate having an aperture contained therein, said aperture having one portion being rectangular, a retaining edge on the outer periphery of said plate, a pair of pivot blocks mounted on said plate on opposite sides of the aperture adjacent to the rectangular portion thereof, an axle mounted in said pivot blocks, a pair of side walls mounted on said axle, said axle and side walls being pivotal relative to said pivot blocks about a fixed axis of rotation, each of said side walls having a bevelled cutting edge with the bevel extending inward, each of said walls having its outermost portion being a portion of a circle having its center on the axis of rotation of the side walls, an arcuate wall sealingly secured to the side walls at the outermost periphery of each of the side walls, a bevelled lead cutting edge on the arcuate wall with the bevel extending inward, said leading edge extending from the cutting edge on one side wall to the cutting edge on the other side wall, and a handle attached to the side walls, whereby said plate is placed on a granular material and the cutting edges are pivoted about the axis of rotation to generate fixed surfaces containing a volume of granular material, which volume of granular material is held within the arcuate wall and side walls.

12. A device of the character described comprising, in combination, a plate having an aperture contained therein, said aperture being partially defined by a straight flat surface and two straight surfaces perpendicular to the first mentioned straight flat surface, a pair of pivot blocks mounted on said plate on opposite sides of said aperture adjacent to the two straight flat surfaces perpendicular to the first mentioned straight flat surface, a blade pivotally mounted on said pivot blocks, said blade having a straight leading edge and a pair of parallel edges perpendicular to the leading edge, each of said edges having a bevel inward thereof, said blade registerable with the straight edge and the two straight surfaces perpendicular to the first mentioned straight flat surface of the aperture to allow the blade to pass through the aperture and generate a surface of generation on the side of the plate opposite the side with the pivot blocks, and a retainer sealingly secured to the blade defining the surface of generation of said blade, whereby the device is placed on a granular material and the blade is rotated about the pivot blocks to define a surface of generation and material is held in the retainer and by the plate.

References Cited in the file of this patent

UNITED STATES PATENTS

| 2,327,123 | Morse | Aug. 17, 1943 |
| 2,388,801 | Roetman | Nov. 13, 1945 |

FOREIGN PATENTS

| 535,717 | Germany | Oct. 14, 1931 |